(12) United States Patent
Horie et al.

(10) Patent No.: US 7,568,880 B2
(45) Date of Patent: Aug. 4, 2009

(54) MICRO-MANIPULATOR

(75) Inventors: Mikio Horie, Warabi (JP); Daiki Kamiya, Yokohama (JP); Naoto Mochizuki, Fuefuki (JP); Yoshimichi Yoda, Yamanashi (JP); Masahiro Kouno, Fuefuki (JP)

(73) Assignees: Nisca Corporation, Minamikoma-gun, Yamanashi (JP); Tokyo Institute of Technology, Tokyo (JP)

( * ) Notice: Subject to any disclaimer, the term of this patent is extended or adjusted under 35 U.S.C. 154(b) by 256 days.

(21) Appl. No.: 11/493,804

(22) Filed: Jul. 27, 2006

(65) Prior Publication Data

US 2007/0023999 A1 Feb. 1, 2007

(30) Foreign Application Priority Data

Jul. 29, 2005 (JP) ............................. 2005-220600

(51) Int. Cl.
*B25J 7/00* (2006.01)

(52) U.S. Cl. .......... 414/740; 901/15; 414/729; 414/917; 294/86.4; 74/490.01

(58) Field of Classification Search ................ 414/680, 414/749.1, 751.1, 753.1, 917, 729, 739, 740; 901/15; 294/86.4, 104; 74/490.01
See application file for complete search history.

(56) References Cited

U.S. PATENT DOCUMENTS 4,687,400 A * 8/1987 Lichti ............................ 414/4

* cited by examiner

*Primary Examiner*—Donald Underwood
(74) *Attorney, Agent, or Firm*—Manabu Kanesaka

(57) ABSTRACT

A compact micro-manipulator with low energy consumption accurately and quickly positions a micro-material in a visual field of a microscope. A micro-manipulator operable to grip micro-material by bringing leading ends of the gripping fingers in close proximity includes an XY drive unit that drives a handling unit in X and Y directions, a drive unit that changes a positional direction of the handling unit in order to swing the gripping fingers around leading ends of the gripping fingers, and a Z drive unit that drives the handling unit in the Z direction.

12 Claims, 11 Drawing Sheets

MICRO-MANIPULATOR

BACKGROUND OF THE INVENTION AND RELATED ART STATEMENT

The present invention relates to micro-manipulators, and particularly to micro-manipulators that bring leading ends of gripping fingers into close proximity to handle micro-materials.

Micro-manipulators are used to assemble micro-parts or to handle cells. Generally, a micro-manipulator has a mechanism for moving gripping fingers to handle (grip) micro-objects (Japanese Patent Publication No. 8-168979, for example). Because the material to be gripped is minute, an operator normally watches the images under a microscope, with the naked eye. Alternatively, images output by a monitor, such as a display via a camera mounted on the microscope, are used to allow a user to operate the micro-manipulator (Japanese Patent Publication No. 4-303810, for example).

In addition, conventional micro-manipulators usually comprise a micro-material state (setting stage), on which the micro-material is disposed in a direction so that the leading ends of the gripping fingers, or other mechanism for changing the direction of the micro-material stage, face the object to be gripped, i.e., the micro-material. For example, when gripping a rectangular-shaped chip element and mounting it on a substrate, the leading ends of the gripping fingers gripping the micro-material and the direction of the substrate are manually positioned so that pins on the chip element lie on the substrate.

However, because the leading ends of the gripping fingers must be manually positioned relative to the micro-material to be gripped, conventional micro-manipulators are troublesome in that they may require trial and error to get the leading ends of the gripping fingers to grip the micro-material. Furthermore, if the object to be gripped is a cell, it may be damaged after multiple attempts. Accordingly, a micro-manipulator that can grip an object with the leading ends of the gripping fingers in one operation, without multiple attempts, is desirable.

Advancements have been made in standardization of chip elements on the order of the 0402 type (0.4 mm×0.2 mm). Therefore, a micro-manipulator that can grip even smaller micro-material, and can accurately and speedily place chips at land positions has even greater demand.

Micro-manipulators having mechanisms for moving the leading ends of the gripping fingers in the three dimension of X, Y, and Z are known in the field. However, unlike the movement in the X and Y directions, the movement of the leading ends of the gripping fingers in the Z direction opposes the direction of gravity and therefore such a feature is accompanied by an increase in the amount of energy consumed.

In view of the problems mentioned above, a compact, energy efficient micro-manipulator that accurately and quickly positions a micro-material in a visual field of a microscope, is desirable.

SUMMARY OF THE INVENTION

To solve the problems mentioned above, the present invention provides gripping means that bring into close proximity leading ends of gripping fingers for gripping micro-material.

In one aspect, first moving means for moving gripping means in X and Y directions are included to swing the gripping fingers centering on the leading ends of the gripping fingers of the gripping means to change the gripping means position direction. In addition, second moving means supported by the first moving means, for moving the gripping means in the Z direction are provided.

According to one aspect of the present invention, the second moving means that move the gripping means in a Z direction are supported by the first moving means. Gripping means are moved in the X and Y directions by the first moving means in the Z direction by the second moving means. Furthermore, the leading ends of the gripping fingers may be positioned with regard to the micro-material by changing the position direction of the gripping means by swinging the gripping fingers, by the first moving means using tips of the gripping fingers of the gripping means as the center of movement. The gripping means bring the tips of the gripping fingers into close proximity to grip the micro-material.

In another aspect, the present invention has a pantograph mechanism that synthesizes and expands the displacement of the X and Y directions input by the first moving means. The second moving means is supported at the output side of the pantograph mechanism. The pantograph mechanism has an X direction input link input with driving force from an X direction actuator that supplies driving force of the X direction, a Y direction input link input with Y direction actuator that supplies driving force of the Y direction, and an output link that synthesizes and outputs displacement of the X and Y directions by the driving force from the X and Y direction actuators.

Driving force from a position changing actuator that changes the position direction of the gripping means gripping fingers can be input to the X direction input link or the Y direction input link, and the X direction input link or Y direction input link input with driving force from the position changing actuator can maintain parallel status with the output link. The X direction actuator or Y direction actuator output unite movably supports the position changing actuator in the X or Y directions. Furthermore, it is preferable that the driving force from the position changing actuator displaces the position of the X direction input link via a lever member.

One aspect of a pantograph according to the present invention includes seven links in substantially straight lines. One end of the first link is connected to the Y direction input link; one end of the second link is connected to an end of the X direction input link; one end of the third link is connected to another end of the X direction input link; one end of the fourth link is connected to an end of the output link; one end of the fifth link is connected to another end of the output link; one end of the sixth link is connected to other ends of the third and the fifth links; and one end of the seventh link is connected to an end of the second link and an end of the X direction input link.

Furthermore, the other ends of the second link and the sixth link are connected to the same position as the fourth link so that the sixth link can maintain a parallel state with the X direction input link and the output link. Another end of the seventh link is connected to the first link to maintain a parallel state with the fourth link.

With regard to the pantograph configuration of the aspect described above, it is preferable that a first triangle formed at the point where the end of the first link is connected to the Y direction input link, the point where the ends of the second and seventh links are connected to the X direction input link, and the point where the other end of the seventh link is connected to the first link, is similar to a second triangle formed by the three points when an end of the first link is connected to the Y direction input link, the point where an end of the fourth link is connected to an end of the output link, and the point where the other end of the first link is connected to the other end of the fourth link.

Driving force is input from the position change actuator to one end of a lever member and the other end is fastened to the X direction input link. It is preferred that a distance between one end and the other end of the lever member, and a distance between a point where one end of the link is connected to an output link and leading ends of the gripping fingers comprise the same homothetic ratio between the first triangle and the second triangle.

According to one aspect of the invention, gripping means are moved in the X and Y directions by the first moving means, and in the Z direction by the second moving means. Furthermore, the first moving means change the position direction of the gripping means by swinging the gripping fingers centering on the leading ends of the gripping fingers of the gripping means, so it is possible to easily position the gripping fingers with regard to the micro-material in the microscope visual field, and accurately and quickly position the micro-material.

The second moving means is supported by the first moving means, and the gripping means is supported by the first moving means so there is no load of the gripping means applied to the second moving means. Therefore, little driving force is needed to move in a Z direction that is opposite to the force of gravity, and therefore consumes a low amount of power.

Furthermore, a micro-manipulator comprising first moving means that includes a configuration for moving the gripping means in the X and Y directions and for changing the position of the gripping means to swing the gripping fingers centering on the leading ends of the gripping fingers of the gripping means may provide a more compact micro-manipulator.

BRIEF DESCRIPTION OF THE DRAWINGS

FIGS. 7(A), 7(B), and 7(C) are views illustrating a swinging principle of the θz drive unit, wherein

FIGS. 8(A), 8(B) and 8(C) are views illustrating the swinging principal of the θz drive unit expressing a rotating pairs of the pantograph mechanism with points, wherein

FIGS. 12(A) and 12(B) are views illustrating a case using an elastic hinge at the rotating pairs, wherein

DETAILED DESCRIPTION OF PREFERRED EMBODIMENTS

The following will explain the micro-manipulator according to the present invention with reference to the drawings provided, as it is applied to a micro-material handling system for positioning micro-material such as cells or micro-components.

Figure 1:
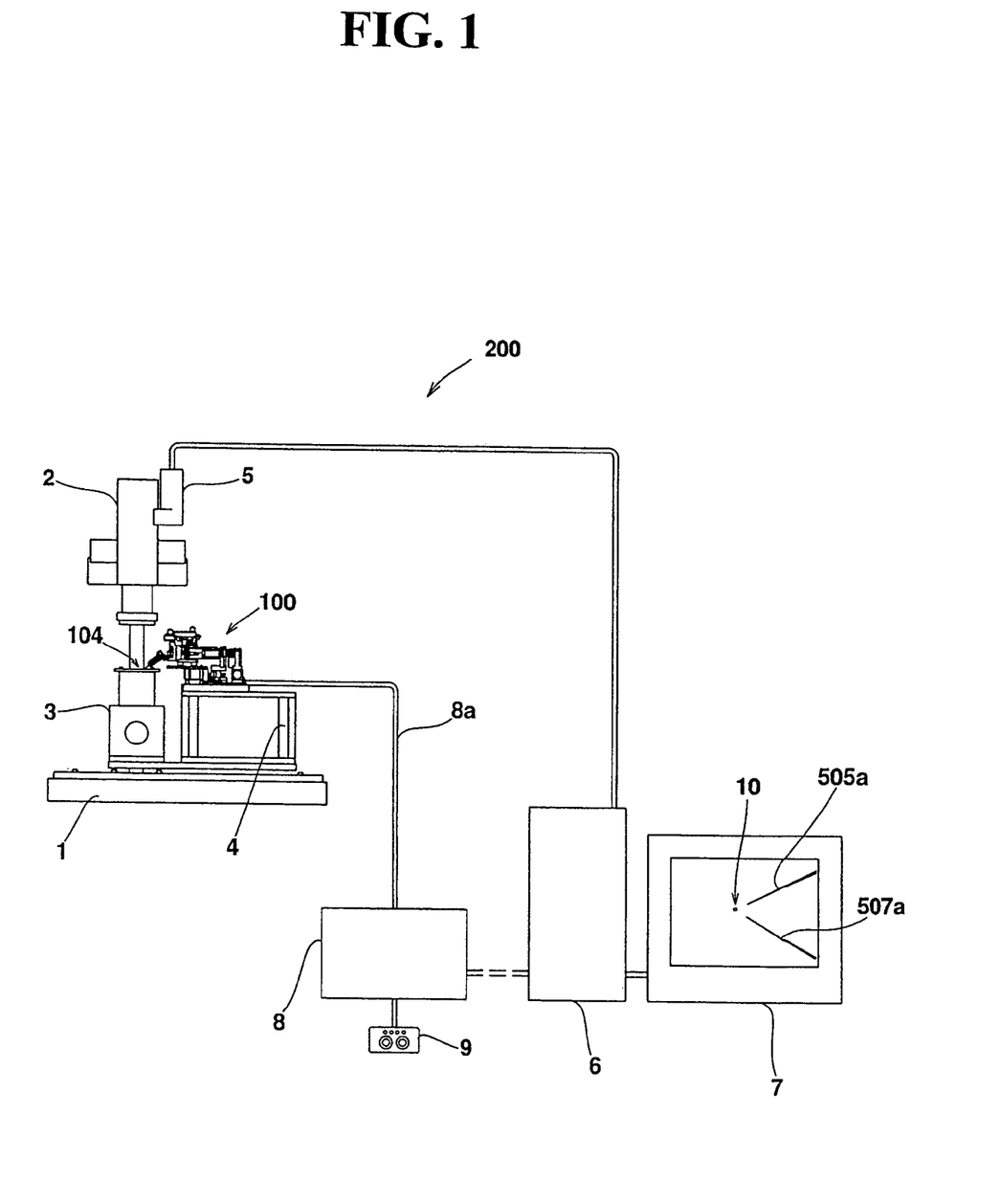
FIG. 1 is a conceptual view of a micro-material handling system according to the present invention.

As shown in FIG. 1, one embodiment of a micro-material handling system 200 includes a micro-material handling device or micro-manipulator 100 that is mounted on a surface plate 1 via a mount 4, and includes a stage 3 fastened to the surface plate 1 for placing micro-material to be handled by the micro-manipulator 100. The micro-material handling system 200 is also equipped with a microscope 2 whose column support is fastened to the surface plate 1 and is mounted with a charge coupled device (CCD) camera, a personal computer (hereinafter referred to as a PC), and a control box embedded with a programmable logic controller (PLC) for controlling the micro-manipulator 100 as a slave computer of PC 6.

The PC 6 is connected with an I/O cable to a control box 8, an output cable to a monitor 7 of an LCD device, and an input cable from the CCD camera. The control box 8 is connected to the micro-manipulator 100 using a connecting cable 8a, and to a controller (input device) 9, that may include a joystick and crosshair button that provides commands to the PLC of the control box 8. Therefore, the operator of the micro-material handling system 200 may control the micro-material handling system 200 via looking through the eyepiece of the microscope 2, or can look at the micro-material 10 placed on the stage 3 via the monitor 7.

The PLC embedded in the control box 8 comprises a CPU, ROM, RAM, D/A converter, and A/D converter. The PLC receives basic operating instructions from the PC 6 according to programs and program data stored in the ROM, and sends data detected by the encoder or various actuator statuses to the PC 6 via a communication interface, such as an Ethernet connection. The PLC also converts instructions input from the controller 9 into each actuator's control signals and sends the control signals to the micro-manipulator 100 via the connecting cable 8a.

Figure 2:
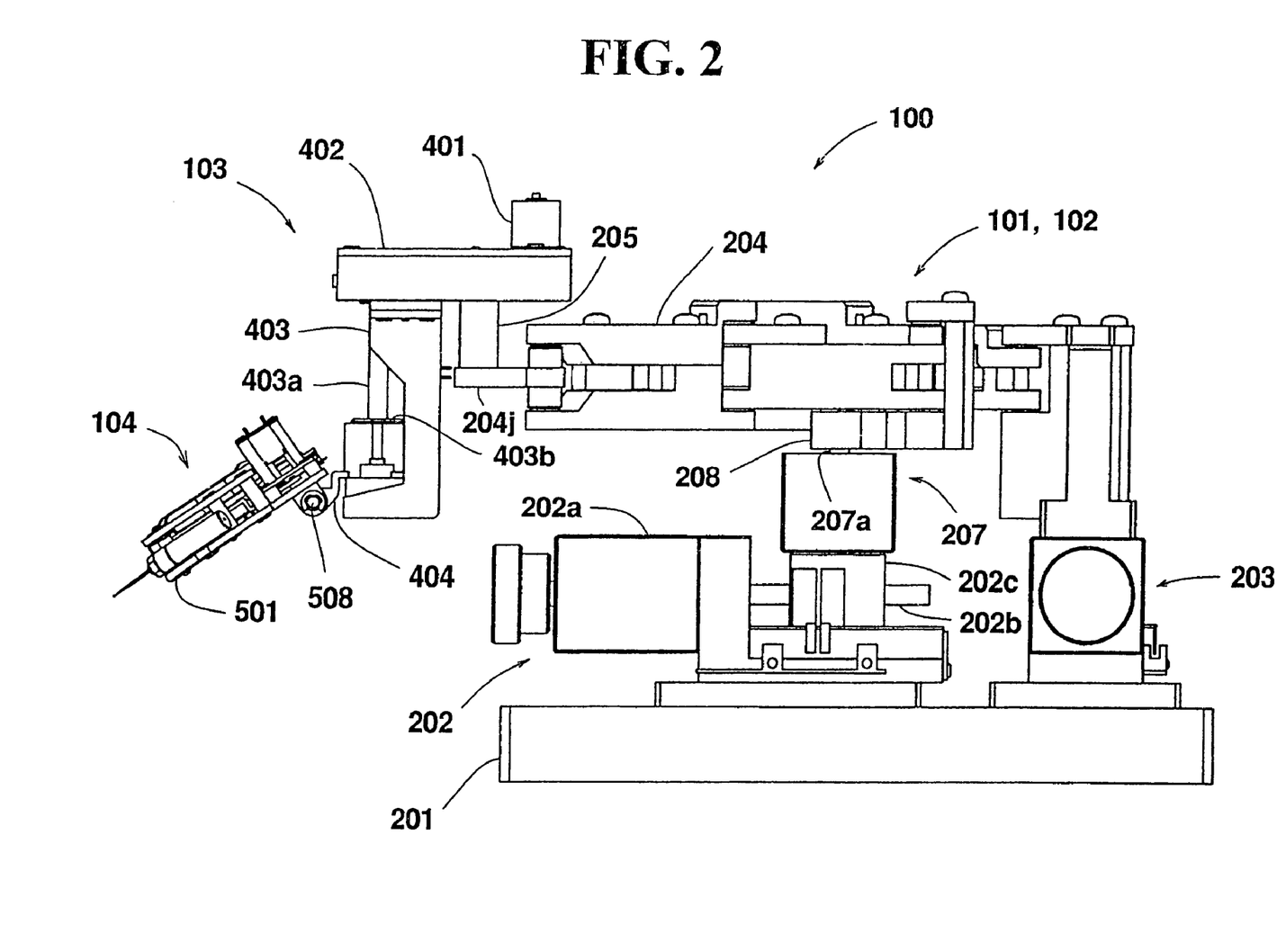
FIG. 2 is a front view of the micro-manipulator of the micro-material handling system according to the present invention.
Figure 3:
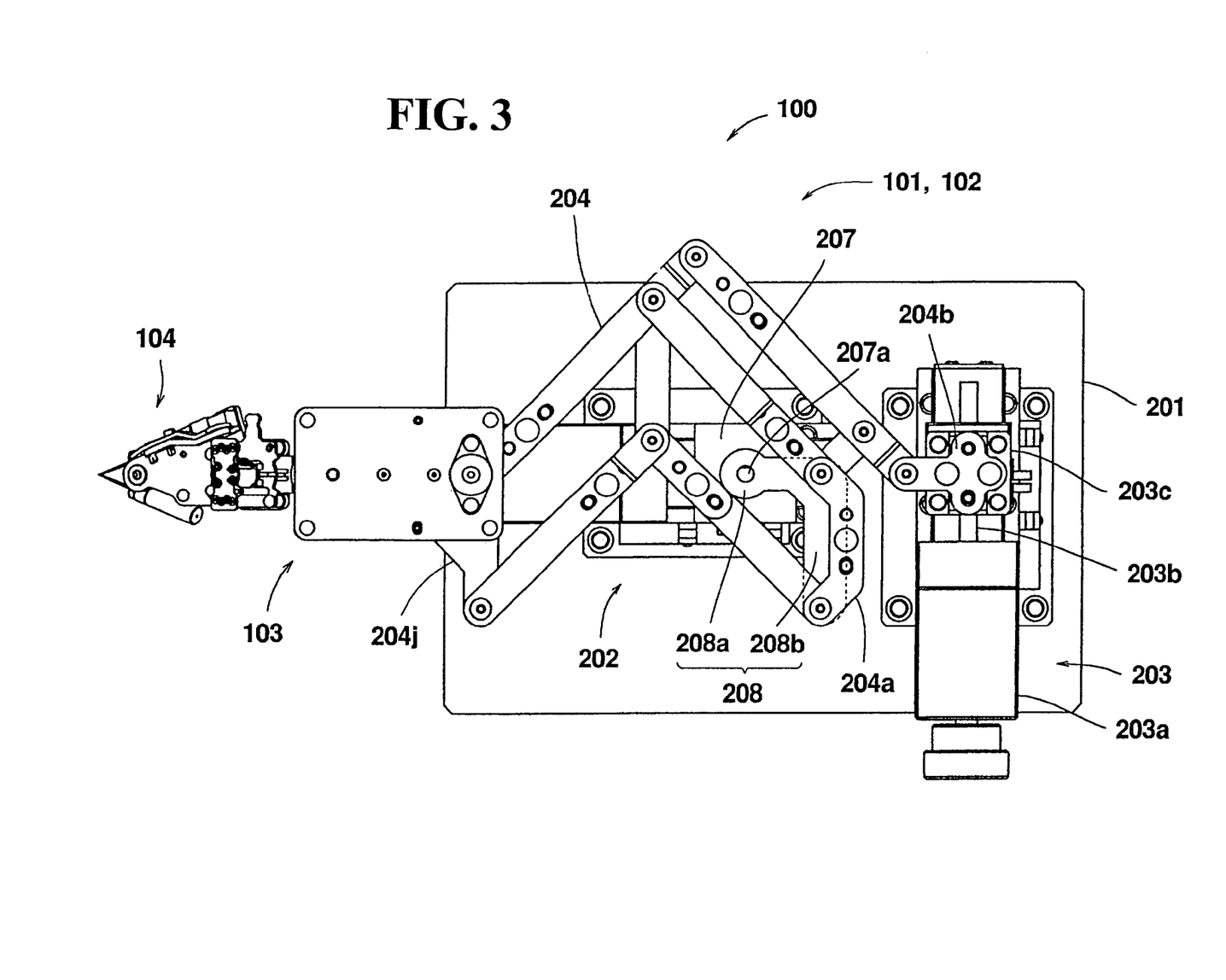
FIG. 3 is a plan view of the micro-manipulator.

As shown in FIGS. 2 and 3, the micro-manipulator 100 includes a handling unit 104 that includes gripping fingers (hereinafter referred to as a fixed finger 505 and a movable finger 507), as a gripping means for handling micro-material. The micro-manipulator 100 further includes an XY drive unit for moving the handling unit 104 in the X and Y directions; a θz drive unit 102 that turns (exactly speaking, to be equivalent to the swinging of the rotating swinging mechanism, hereinafter swinging is used) the handling unit 104 using the leading ends (hereinafter referred to as the leading ends of the end effecter 505a) of the gripping fingers of the handling unit 104 as the center of rotation, to change the position direction of the leading ends of the gripping fingers of the handling unit 104 with regard to the micro-material placed on the stage 3.

The micro-manipulator 100 further includes a second moving means, i.e., Z drive unit 103, which moves the handling unit 104 in the Z direction. Note that the XY drive unit 101 and the θz drive unit 102 comprise a single unit, as described below, and function as the first moving means of the invention.

XY Drive Unit 101 and θz Drive Unit 102

The micro-manipulator 100 has a base 201 fastened to the mount 4, described above. The base 201 is fastened by the X direction actuator 202 that is the drive source for driving the handling unit 104 in the X and Y directions, and the Y direction actuator 203, each fastened in directions intersecting each other.

The X direction actuator 202 is a direct acting actuator having a forward and reverse drive stepping motor 202a that has an encoder as an output unit that engages a ball screw 202b formed on an opposite side of an encoder. The encoder comprises a slider 202c that is driven by the output shaft of the stepping motor 202a.

The X direction actuator 202 further comprises a rectilinear guide rail, not shown, that can guide the slider 202c.

In a similar fashion, the Y direction actuator 203 has a forward and reverse drive stepping motor 203a that has an encoder, and a slider 203c that is driven by an output shaft of the stepping motor 203a, and engages a ball screw 203b formed on an opposite side of the encoder. A rectilinear guide rail, not shown, is also included that can slide the slider 203c.

A θz actuator 207, i.e., a stepping motor, is fastened to the slider 202 of the X direction actuator 202, and functions as a position changing actuator that supplies driving force to change the position of the gripping fingers of the handling unit 104. A lever 208 is fastened to the θz actuator 207 output shaft 207a. The lever 208 is flat, substantially L-shape, and comprises a supporting unit 208a and a fastening unit 208b.

The supporting unit 208a of the lever 208 is mated to an output shaft 207a of the θz actuator 207. The fastened unit 208b is fastened to the X direction input link 204a of the pantograph mechanism 204. In addition, the slider 203c of the Y direction actuator 203 is fastened to the Y direction input link 204b of the pantograph 204. For that reason, the X direction actuator 202, the Y direction actuator 203, and the θz actuator 207 apply direct displacement (θz displacement) to the pantograph 204, in order to directly displace the X and Y directions, and to change (to rotate the gripping fingers) the position of the gripping fingers of the handling unit 104, as described below. Note that in FIG. 3, the shape of the lever 208 is shown with dotted lines where it overlaps the X direction input link 204a.

Figure 4:
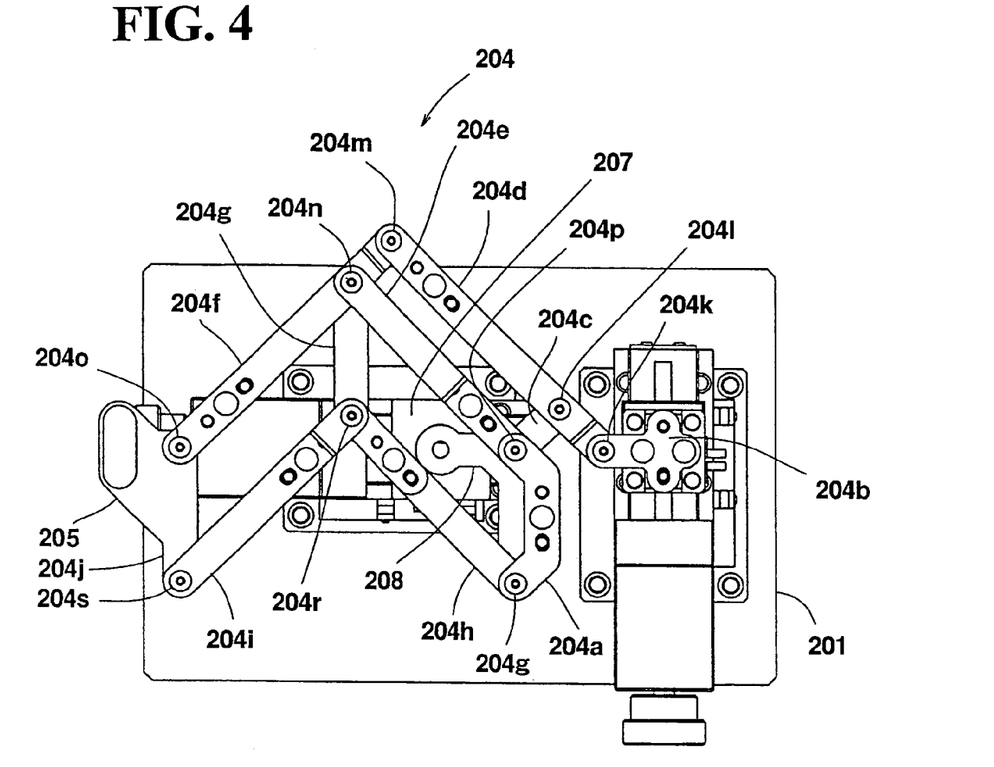
FIG. 4 is a plan view of an XY drive unit and a θz drive unit of the micro-manipulator before installing a Z drive unit.

As shown in FIG. 4, the pantograph mechanism 204 has substantially straight-line links 204c to 204i and rotating pairs 204k to 204s that directly displace for synthesizing and enlarging and outputting to the output link 204j, direct displacement in the X and Y directions input to each from the X direction actuator 202, the Y direction actuator 203 and the θz actuator 207 as well as the X direction input link 204a, Y direction input link 204b, and output link 204j, described above. Note that to describe the relationships of the first to the seventh link, i.e., the links 204c to 204i of this embodiment of the present invention, the first link corresponds to the link 204d, the second link corresponds to the link 204e, the third link corresponds to the link 204h, the fourth link corresponds to the link 204f, the fifth link corresponds to the link 204i, the sixth link corresponds to the link 204g, and the seventh link corresponds to the link 204c.

Pantograph mechanism 204 applies displacement from the X direction input link 204a and Y direction input link 204b to the output link 204j via a pantograph composed of links 204c, 204d, 204e, and 204f. Links 204g, 204h, and 204i are links added to a parallelogram loop formed by the two squares of pqrn and osrn (when using the alphabetic letters of the positions of the rotating pairs 204k to 204s) (see FIG. 8(A)) and function to maintain a fixed posture of the output link 204j. The details are described below.

Pantograph mechanism 204 is configured such that: one end of link 204d is connected to the Y direction input link 204b via a rotating pair 204k; one end of the link 204e is connected to one end of the X direction input link 204a via a rotating pair 204p; one end of link 204h is connected to the other end of the X direction input link 204a via a rotating pair 204q; one end of link 204f is connected to one end of the output link 204j via a rotating pair 204o; the other end of link 204i is connected to the other end of the output link 204j via a rotating pair 204s; another end of the link 204d is connected to the other end of the link 204f via a rotating pair 204m; the other end of link 204h is connected to the other end of the link 204i via rotating pair 204r; one end of the link 204g is connected to the other ends of the links 204h and 204i via a rotating pair 204r; and one end of link 204c is connected to ends of the links 204e and X direction input link 204a via rotating pair 204p.

Furthermore, the other ends of links 204e and 204g are connected at the same position as link 204f via rotating pair 204n, so that the link 204g will maintain a state parallel to the X direction input link 204a and output link 204j, regardless of the input of driving force from the X direction actuator 202, Y direction actuator 203 and θz actuator 207. The other end of the link 204c is connected to the link 204d via the rotating pair 204l in order to maintain a state parallel with link 204f.

In addition, regardless of the input of driving force from the X direction actuator 202, Y direction actuator 203 and θz actuator 207, the first isosceles triangle formed by the three points of 204k, 204p, and 204l, of the rotating pairs maintains a similar state to the second isosceles triangle formed by the three points, 204k, 204o and 204m of the rotating pair, and the distance from a pivot point 208a, i.e., one end of the lever 208, to the rotating pair 204p (another end) and the distance from the leading ends of the gripping fingers of the handling unit 104 (the leading end of the end effecter 505a, described below) to the rotating pair 204o are the same as the homothetic ratios of the first isosceles triangle and the second isosceles triangle.

Therefore, according to this embodiment, if there is no driving force input from the θz actuator 207, the positions of the rotating pair 204k, and 204p, and the pivot point 208a of the lever 208 (the rotating shaft 207a of the θz actuator 207) and rotating pair 204o and the leading ends of the gripping fingers of the handling unit 104 are positioned along the same straight line.

As shown in FIGS. 2 to 4, the pantograph mechanism 204 is arranged above the X direction actuator 202, the Y direction actuator 203 and the θz actuator 207 so that it does not interfere with them. Also, a support member 205 formed with a mating hole for mating and fastening a leg portion, not shown, extended downward from a gear box 402 of the Z drive unit 103 is arranged in an erect manner at substantially a center of the output link 204j (see FIG. 4). The Z drive unit 103 is supported by the output link 204j of the pantograph mechanism 204, via the support member 205.

Z Drive Unit

As shown in FIG. 2, the Z drive unit 103 comprises a forward and reverse drive stepping motor 401, a gear box 402 having a deceleration gear train that decelerates rotational drive force from the stepping motor, and a Z direction direct acting mechanism 403.

Figure 5:
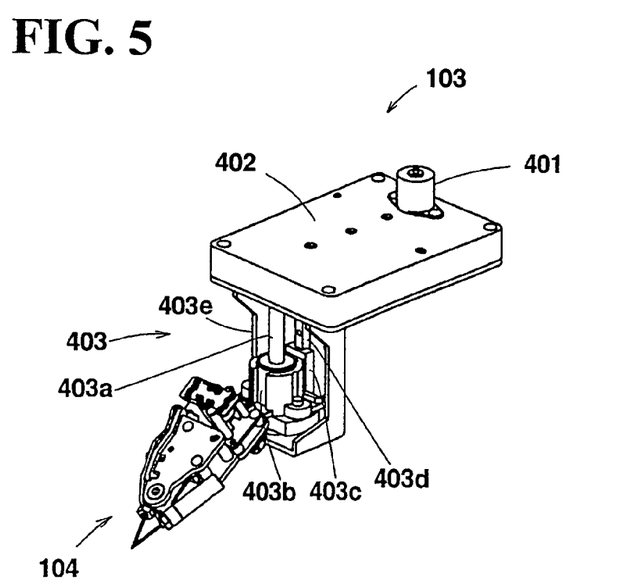
FIG. 5 is a perspective view of the micro-manipulator including the Z drive unit.

As shown in FIG. 5, the Z direction direct acting mechanism 403 includes a ball screw 403a, nut 403b, slider 403c, guide rail 403d and holder 403e. In other words, the ball screw 403a extends downward and is arranged at the output end of the gear box 402 deceleration gear train. The leading end side of the ball screw 403a is pivotally supported to rotate on the holder 403e fastened to the gear box 402. The nut 403b is fastened by a screw to the ball screw 403a. The slider 403c is fastened to the nut 403b. The rectilinear guide rail 403d is arranged to be parallel to the ball screw 403a, from the gear box 402. The leading end side of the guide rail 403d is fastened to the holder 403e. The slider 403c touches slidable guide rail 403d and is configured to slide to the top of the guide rail 403d.

Handling Unit

As shown in FIG. 2, a linking member 404, formed with a through hole, is disposed on the leading end of the handling unit 104, at the nut 403b of the Z direction direct action mechanism 403. The handling unit 104 is fastened to the Z drive unit 103 by linking pins 508 that penetrate through two through holes 510 (see FIG. 6) formed at a bottom of the base 501, and through holes, not shown, formed at the leading ends of the handling unit 104 side of the linking member 404.

Figure 6:
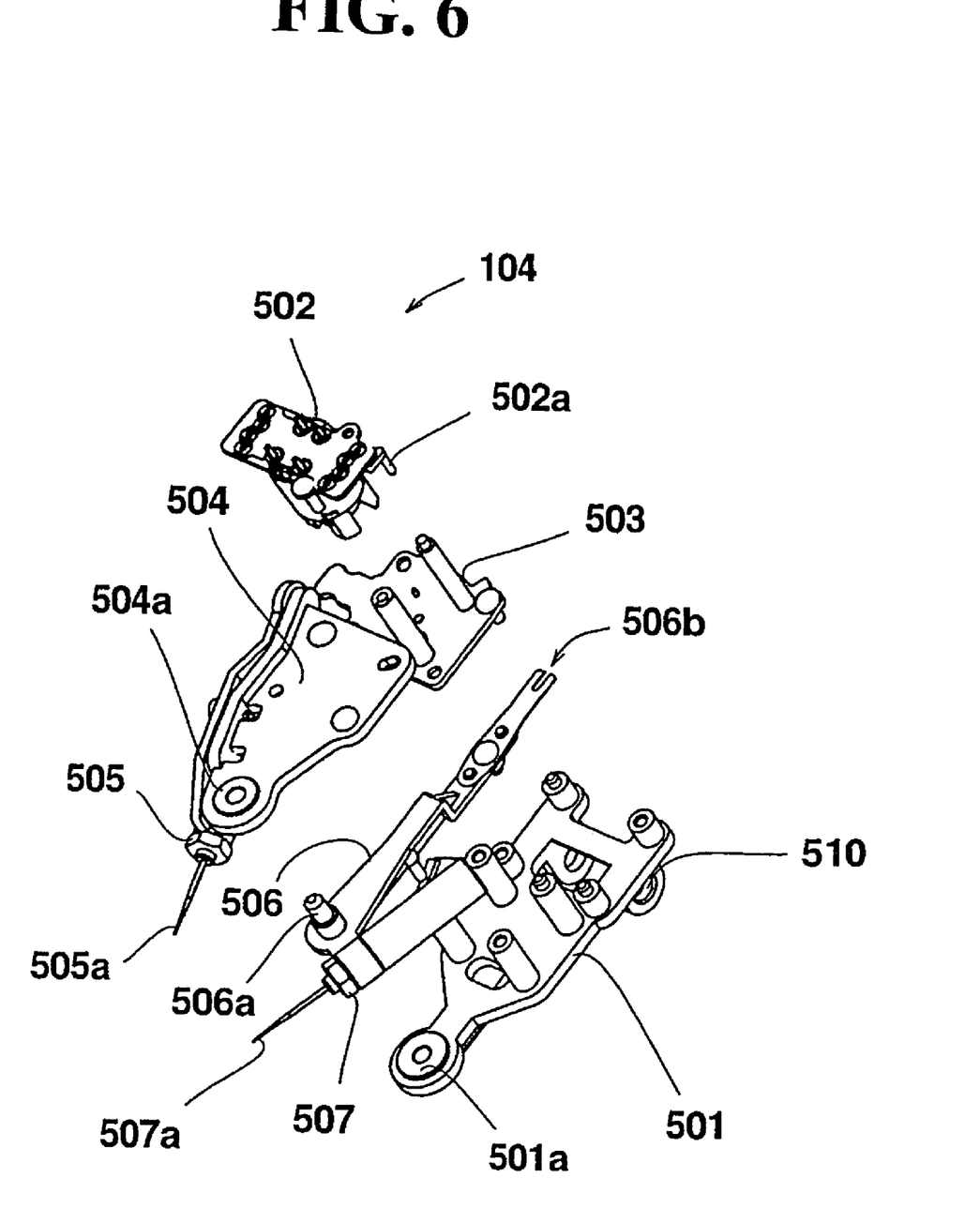
FIG. 6 is an exploded, perspective view of the handling unit of the micro-manipulator.

As shown in FIG. 6, the handling unit 104 has two gripping fingers (fixed finger 505 and movable finger 507) for gripping micro-material. End effecters 505a and 507a that touch micro-material are installed on each of the fixed finger 505 and movable finger 507 respectively.

An actuator 502, such as a motor, is fastened to the base 501 of the handling unit 104 along with the bracket 503. The fixed finger 505 is incorporated (fastened) into the plate 504. The plate 504 is fastened to the base 501 forming a fixed gap with the base 501, with the fixed finger 505 installed. A long, plate-shaped lever 506 lies in this gap. The movable finger 507 is fastened to a side (the opposite side of the Z drive unit 103) of the leading end of the lever 506. A pivot point shaft 506a projects in both up and down directions at the center of the leading end side. This gap is demarcated by the pivot point shaft 506a being supported at the bearing 504a of the base of the plate 504 and the bearing 501a of the base 501.

A substantially U-shaped slit (notch) 506b is formed at the trailing end of the lever 506. An output pin 502a of the actuator 502 engages this slit 506b. Therefore, when the actuator 502 is driven, the lever 506 rotates around the pivot point shaft 506a, thereby bringing the end effecter 507a of the movable finger 507 near to and away from the end effecter 505a of the fixed finger 505 to grip or to release the micro-material. Note that the end effecter 505a and the end effecter 507a are adjustable by a screw arranged at the fixed finger 505 and the movable finger 507 so that their leading ends can touch each other.

Operations

Operation of the micro-material handling system 200 according to the present embodiment will be explained for each function of the micro-manipulator 100, focusing on the operation of the micro-manipulator 100.

As shown in FIG. 1, a micro-material 10 placed on the stage 3 and end effecters 505a and 507a of the handling unit 104 are viewed by an operator on a monitor using the microscope 2, camera 5 and PC 6. In this state, the operator provides position directions for the handling unit 104, including the X direction, Y direction, θz direction (sliding angle of the handling unit 104 centering on the leading end of the end effecter 505a). In addition, handling (opening/closing) instructions for the gripping fingers are transmitted from the controller to the micro-manipulator 100 via the PLC of the control box 8, in order to control the relative relationship of the micro-material 10 and end effecters 505a and 507a.

X Direction Drive

As shown in FIGS. 2 to 4, when an operating signal is applied to the X direction actuator 202, the stepping motor 202a rotates the ball screw 202b, thereby moving the X direction input link 204a of the pantograph mechanism 204 in a horizontal direction, i.e., the X direction, via the slider 202c (FIG. 3). When doing so, the PLC excites the Y direction actuator 203 and the θz actuator 207 maintains a θz=zero degrees state. The displacement of the rotating pair by the excitement of the Y direction actuator 203 in the Y direction is locked, so the displacement of the rotating pair 204p is enlarged according to a homothetic ratio of the triangles kpl:kom (when using the alphabetic letters k to s for the positions of the rotating pair 204k to 204s) (see FIG. 8(A)) and output to the rotating pair 204o, thereby moving the rotating pair 204o.

Y Direction Drive

When an operating signal is applied to the Y direction actuator 203, stepping motor 203a rotates the ball screw 203b, thereby moving the Y direction input link 204b of the pantograph mechanism 204 in a vertical direction, i.e., the Y direction, via the slider 203c (FIG. 3). When doing so, the PLC excites the X direction actuator 202 and the θz actuator 207 maintaining a θz=zero degrees state. The displacement of the rotating pair by the excitement of the Y direction actuator 203 in the Y direction is locked, so the displacement of the rotating pair 204p is enlarged according to a homothetic ratio of the triangles kpl:kom (when using the alphabetic letters k to s for the positions of the rotating pair 204k to 204s) (see FIG. 8(A)), and output to the rotating pair 204o, thereby moving the rotating pair 204o.

XY Direction Drivers

As described above, synthesized displacements of the displacements of the X and Y directions are output to the output link 204 of the pantograph mechanism 204 by the input from the X and Y directions. To simplify an explanation of X and Y direction drives, an example is given wherein the Y direction input link 204b does not move when the Y direction actuator 203 is excited while the X direction drive is applied, and where the X direction input link 204a does not move when the X direction actuator 202 is excited while the Y direction drive is applied. Non-limiting, it is possible to simultaneously apply both the X and the Y direction drives.

As described above, when applying the X and Y direction drives, in order to maintain the pantograph mechanism 204 position in the state shown in FIG. 4, it is necessary to maintain the state where θz=zero degrees when the θz actuator 207 is excited.

θZ Direction Drive

When the operation signal is applied to the θz actuator 207, the θz actuator 207 rotates the output shaft 207a, and the lever 208 mated with the output shaft 207a applies rotating displacement to the X direction input link 204a of the pantograph mechanism 204 using the point 208a as a pivot point.

Figure 7:
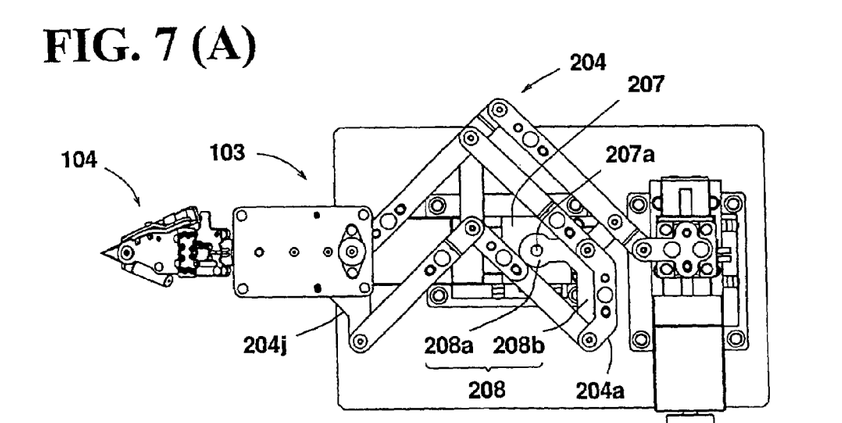
FIG. 7(A) is a plan view prior to swinging.
FIG. 7(B) is a plan view showing the unit swung in a counterclockwise direction.
FIG. 7(C) is a plan view showing the unit swung in a clockwise direction.

FIG. 7(B) shows the lever 208 swung from the state shown in FIG. 7(A) in the counterclockwise direction a degrees (for example 15 degrees) with regard to the pivot point 208a. FIG. 7(C) shows the lever 208 swung from the state shown in FIG. 7(A) in the clockwise direction β degrees (for example 15 degrees) with regard to the pivot point 208a. Swinging displacement of the same angle is output to the output link 204j when swinging displacement is applied to the X direction input link 204a of the pantograph mechanism 204 by the lever 208.

Figure 8:
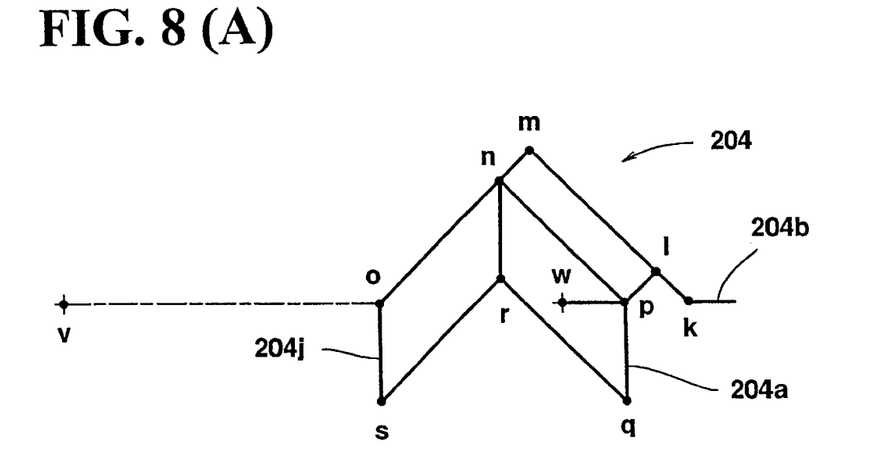
FIG. 8(A) is a view of a configuration according to FIG. 7(A)
FIG. 8(B) is a view of a configuration according to FIG. 7(B)
FIG. 8(C) is a view of a configuration according to FIG. 7(C).

This will be explained with reference to a structural chart. FIGS. 8(A) to 8(C) correspond to the states shown in FIG. 7(A) to 7(C). FIG. 8(A) shows the positions of the rotating pairs 204k to 204s, using the letters of the alphabet associated with those points (namely k to s) for those positions. The position of the pivot point 208a (the rotating shaft 207a of the θz actuator 207) of the lever 208 is expressed as point w, and the virtual central swinging point of the output link 204j is expressed as point v. If the position of the pivot point 208a of the lever 208 is taken on a straight line passing through the points of k, p, and o, the center of the swinging of the output link 204j would be on that straight line.

Because the ratio of the distance of the line ov: line pw has the homothetic ratio of the triangles kpl:kom, it is possible to set the position of the pivot point 208a of the lever 208 and point w position for the position to swing the output link 204j, the position v. As shown in FIG. 7(A), the leading ends of the end effecter 505a of the handling unit 104 are set to be the center of the position of the pivot point 208a of the lever 208.

As shown in FIG. 8(B), if the point w is the center and the point p is angle α of the swing, the triangle kpl is formed with point k as the fixed point. The triangle kom is deformed to maintain a similar figure, and point o is enlarged and displaced with regard to the displacement of point p. The displacement of point o is the swinging angle α centering on point v. The points q, r, and s function as rotating pairs to form two parallelogram loops (squares pqrn, and osrn) applied to maintain the fixed angle for angle vos. As shown in FIG. 8(C), even if point p is swung β degrees in the clockwise direction centering on point w, in the same way, point o will swing β degrees in the clockwise direction centering on point v.

Z Direction Drive

As shown in FIG. 5, when a drive signal is applied to the stepping motor 401, the stepping motor 401 rotates the ball screw 403a via the deceleration gear train established in the gear box 402, thereby moving the handling unit 104 unitized to the nut 403b in up and down directions in FIG. 5 along the guide rail 403d.

Gripping Drive

As shown in FIG. 6, when a drive signal is applied to the actuator 502, the output pin 502a is displaced, transmitting displacement to the slit 506b of the lever 506 thereby swinging the lever 506 around the pivot shaft 506a. Through this, the end effecter 507a of the movable finger 507 moves toward or away from the end effecter 505a of the fixed finger 505. Therefore, the two gripping fingers of the fixed finger 505 and movable finger 507 are able to grip a micro-material 10 or to open to free the micro-material 10.

Actions

Next, the actions of the micro-material handling system 200 of the present embodiment will be explained focusing on the actions of the micro-manipulator 100.

The micro-manipulator 100 has an XY drive unit 101 that drives, i.e., moves, the handling unit 104 in the X and Y directions using the pantograph mechanism 204. The micro-manipulator 110 further comprises the θz drive unit 102 that drives (that changes the position of the handling unit 104 to swing the gripping fingers centering on the leading ends of the end effecter 505a), the handling unit 104 that moves the micro-manipulator 110 in the θz directions, and the Z drive unit 103 that drives the handling unit 104 in the Z direction.

Therefore, the θz drive unit 102 may be used to adjust the contact (gripping) position (direction) of the end effecters 507a and 507 with regard to the micro-material 10 when there are operating restrictions in a gripping direction of micro components, such as rectangular-shaped components, or when there are operating restriction of the end effecters 505a and 507a to handle cells, even round-shaped egg cells. Accordingly, the micro-manipulator 100 is able to accurately and speedily handle micro-material.

Furthermore, the end effecter 507a (the leading end) that grips the micro-material is the center of the swinging action, making it possible to reduce the total amount of changes by changing the position direction of the end effecter 507a, thereby easily operating the micro-manipulator in the visual field of the microscope.

Also, the Z drive unit 103 is supported by the output link 204j of the pantograph mechanism 204 via the support member 205 on the micro-manipulator 100. The handling unit 104 is supported by the Z drive unit 103 (the nut 403b of the Z direction direct acting mechanism 403) via the linking member 404 and linking pin 508.

The following will compare the present invention, i.e., micro-manipulator 100, to the micro-manipulator previously proposed by the present inventors in Japanese Patent Application No. 2004-166000, i.e., comparative example 1, and hereby incorporated by reference in its entirety.

Figure 9:
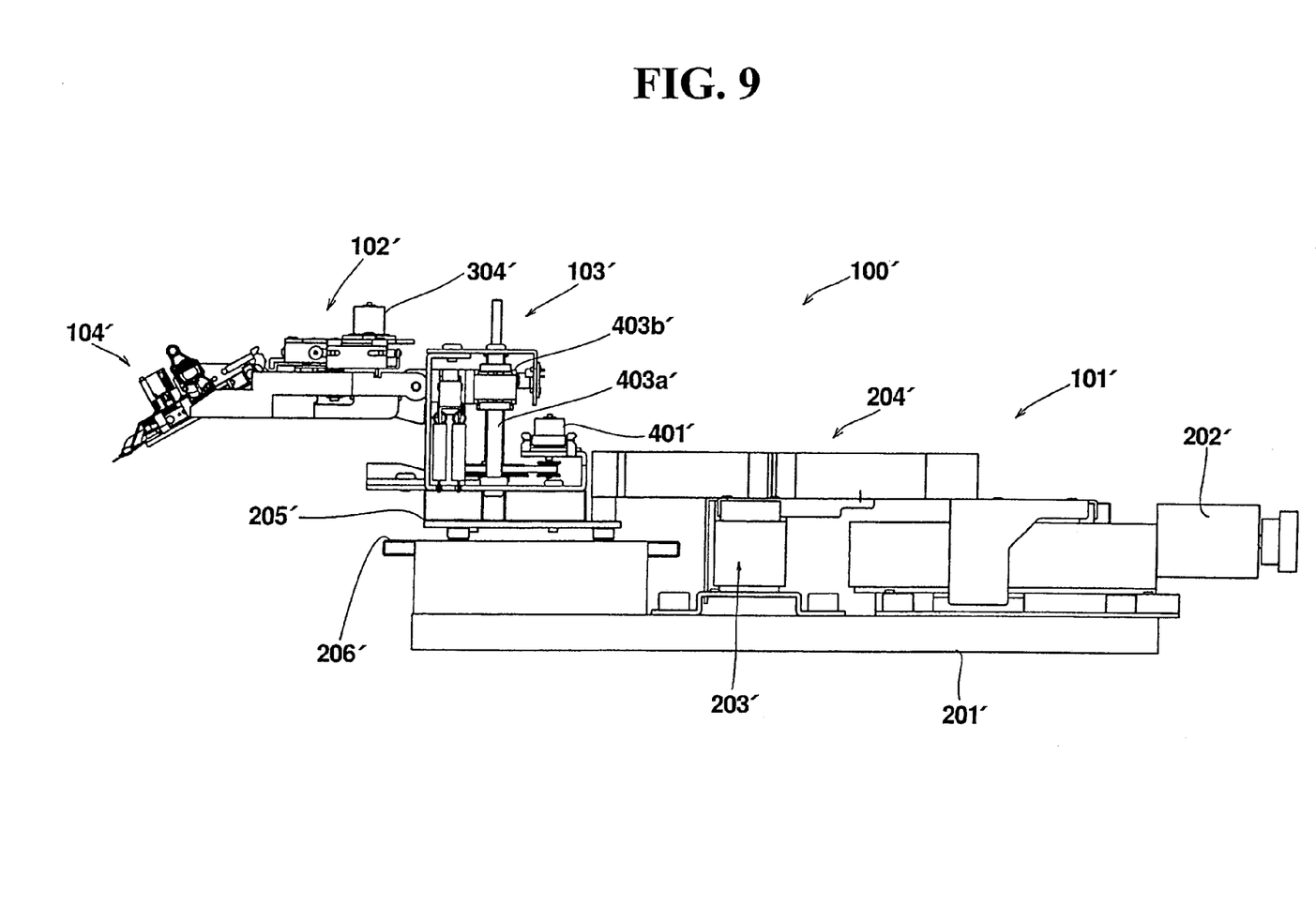
FIG. 9 is a front view of the micro-manipulator of a comparative example 1.

As shown in FIG. 9, an X direction actuator 202' and Y direction actuator 203' are arranged on a base 201' for the micro-manipulator 100' of the comparative example 1. Both actuators input displacement to an input link of the pantograph mechanism 204'. A Z drive unit 103' is fastened to the output link of the pantograph mechanism 204'. An XY slider 205' and bearing surface 206' having legs that receive the load of the Z drive unit 103' and move over a plane are provided at a bottom surface side of the Z drive unit 103'. The Z drive unit 103' transmits drive torque supplied by stepping motor 401' to a ball screw 403'. The Z drive unit further transmits Z direction drive to the θz drive unit 102' embedded in a nut 403' that has a drive source stepping motor 304', and further transmits Z direction drive to a handling unit 104' disposed in front of the motor 304'.

Differences between the present embodiment and the comparative example 1 include:

(1) The comparative example 1 requires a stepping motor 401' to provide rotational drive (rotational torque) to drive the θz drive unit 102' and the handling unit 104' for the Z direction. Whereas in the present invention, the rotational torque from the stepping motor 401 is enough to drive only the handling unit 104.

(2) In the comparative example, rotational torque provided by the stepping motor 304' is enough to drive only the handling unit 104', whereas according to one embodiment of the present invention, rotational torque provided by the θz actuator 207 drives both the Z drive unit 103 and the handling unit 104.

In consideration of the differences of (1) and (2) outlined above, Z direction drive is movement in opposition to the force of gravity, so the loads of the stepping motors 401 and 401' become greater. The drive in the θz direction has a low load in comparison to the Z drive direction, along with the increase in potential energy. Therefore, the micro-manipulator 100 of the present invention makes the sum of the drive loads of the stepping motor 401 and θz actuator 207 less than the sum of the drive loads of the stepping motor 401' and stepping motor 304' of the micro-manipulator 100' of the comparative example 1, reducing energy consumption.

Furthermore, the micro-manipulator 100 inputs the drive force of the θz actuator 207 to the X direction input link 204a via the lever 108 to change the position direction (θz direction) of the gripping fingers of the handling unit 104. The following will explain the actions and effects in comparison to the micro-manipulator proposed by the inventors in Japanese Patent Application No. 2005-23796, hereby incorporated by reference in its entirety. Note that as a matter of convenience, the micro-manipulator 100 of the present invention is a practical example, and the micro-manipulator proposed by the inventors in Patent 2005-23796 is referred to as comparison example 2.

Figure 10:
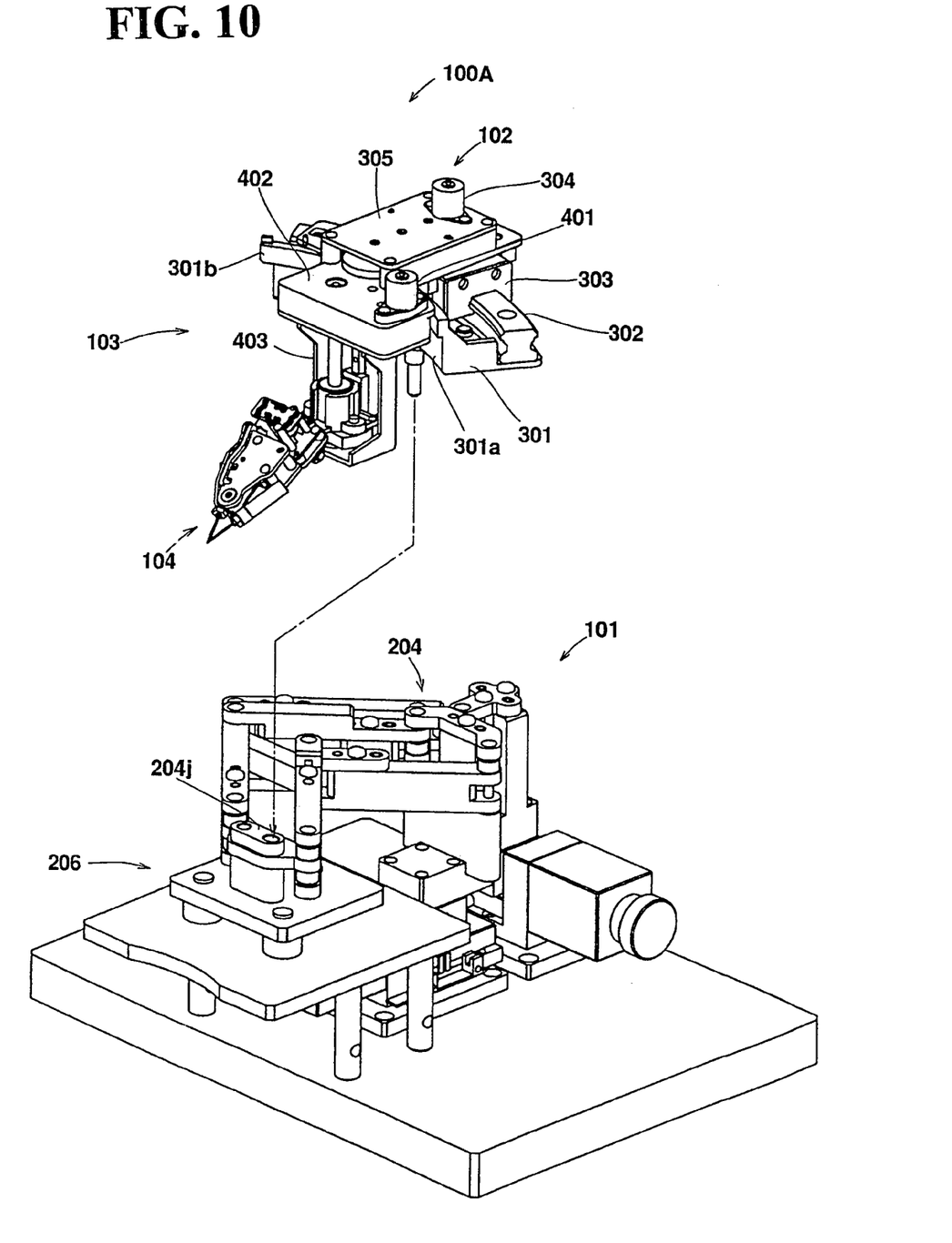
FIG. 10 is a partially exploded view of the micro-manipulator of a comparative example 2.

As shown in FIG. 10, the θz drive unit 102 in the micro-manipulator 100 of the comparative example 2 does not displace the pantograph mechanism 204, but is independently arranged at the output side (output link 204 side) of the pantograph mechanism 204. The θz drive unit 102 has a base 301. A circular arc-shaped guide rail 302 is fastened to the base 301. A slidable slider 303 is mated to the top of the guide rail 302 on the guide rail 302. The center of the circular arc of the guide rail 302 matches the leading ends of the gripping fingers of the handling unit 104. A stepping motor 304 and a gear box 305 composed of a deceleration gear train that decelerates the rotational drive from the stepping motor 304 are fastened to the slider 303.

Furthermore, a circular arc-shaped wall surface 301a is formed in a concentric circle-shape with the guide rail 302 at the Z drive unit 103 side on the base 301. An internal tooth gear 301b that projects from the circular arc-shaped wall 301a to the Z drive unit 103 (the handling unit 104) side is unitized to the top side of the circular arc-shaped wall 301a of the base 301.

Furthermore, the θz drive unit 102 of the comparative example 2 is independently arranged at the output side of the pantograph mechanism 204, and members such as the base 301, the guide rail 302 and the gear box 305, embedded with the deceleration gear train, are required. Unlike comparative example 2, the present invention does not require these members. The drive force of the θz actuator 207 is sufficient if input to the X direction input link 204a of the pantograph mechanism 204 via the lever 208.

When considering the difference of (3) above, the micro-manipulator 100 of the embodiment does not require the members of the base 301, the guide rail 302, and the gear box 305 of the micro-manipulator 100A of the comparative example, so the micro-manipulator can be made more compact and lower cost.

Note that the embodiment of the present invention shows the handling unit 104 that has two gripping fingers. The present invention is not limited to that configuration and can change the shapes, the number of, and the shapes of the end effecters to correspond to the shape of the micro-material. Also, this embodiment of the present invention shows an example wherein the movable finger 507 comes into proximity of the fixed finger 505, but it is perfectly within the scope of the present invention to allow both gripping fingers to mutually move into proximity. In this case, the actuator that drives (opens/closes) the gripping fingers can employ any possible drive configuration for both of the gripping fingers, one being preferable, because there is a lower load of the stepping motor 401 of the Z drive unit 103.

Also, with this embodiment of the present invention, an example was provided of mating the pivot point 208a of the lever 208 to the output shaft of the θz actuator 207, but again the present invention is not limited to that configuration. For example, it is possible to input drive force of the θz actuator 207 to the pivot point 208a of the lever 208 via deceleration gears. In such a case, the position of the output shaft of the deceleration gears is point w shown in FIG. 8(A).

As shown in FIG. 4, with this embodiment of the present invention, an example was provided for a pantograph mechanism 204 configured by the X direction input link 204a, the Y direction input link 204b, and the output link 204j, in addition to the substantially straight-lined links 204c to 204i, and the rotating pairs 204k to 204s. However, as shown in FIGS. 11(B) to 11(M), instead of the pantograph mechanism 204 of the present embodiment (see FIG. 11(A)), various types of pantograph mechanisms can be employed. Note that in FIGS. 11(A) to 11(M), "a" represents the X direction input link; "b" represents the Y direction input link; "j" represents the output link. Further, θ is the link input with driving force from the θz actuator; X is the input point of the driving force from the X direction actuator; and Y is the input point of the driving force from the Y direction actuator.

Also, in this embodiment of the present invention, the slider 202c of the X direction actuator 202 movable supports the θz actuator 207 in the X direction, and an example is provided where driving force from the θz actuator 207 is input to the X direction input link 204a via the lever 208. Non-limiting, the slider 203c of the Y direction actuator 203 may movably support the θz actuator 207 in the Y direction, and can input driving force from the θz actuator 207 to the Y direction input link via the lever. However, in this configuration, it is necessary for the Y direction input link to maintain a state parallel with the output link 204j, and to be configured as a link and not as an input point, regardless of the input of driving force from the X direction actuator 202, Y direction actuator 203, and θz actuator 207.

Figure 11:
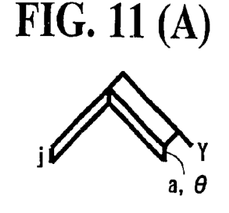
FIG. 11(A) is a pantograph of an embodiment of the present invention.
FIGS. 11(B) to 11(M) are pantographs of other embodiments of the present invention that may be applied.

For example, FIG. 11(M) is an example of the driving force from the θz actuator 207 being input to the Y direction input link, but when compared to FIG. 11(A) representing the present embodiment of the invention, it is necessary for the Y direction input link to maintain a parallel state with the output link 204j, and for a configuration as link not as an input point.

Figure 12:
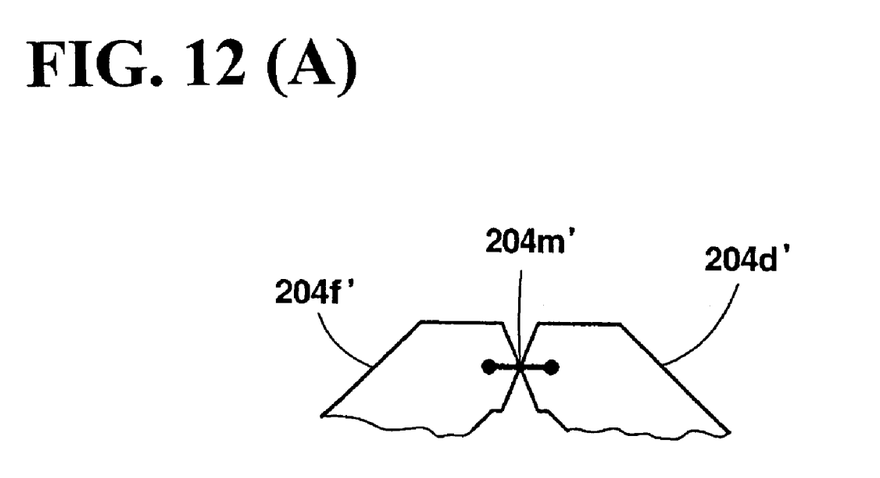
FIG. 12(A) is a view of the elastic hinge connecting two links.
FIG. 12(B) is a plan view of the elastic hinge connecting three links.

Furthermore, although the present embodiment shows an example of the rotating pairs 204k to 204s as members that contact the X direction input link 204a, Y direction input link 204b, and links 204c to 204i, this embodiment is non-limiting. For example, it is acceptable to use an elastic hinge that is integrally formed with the links, as shown in FIGS. 12(A) and 12(B).

Japanese patent application No. 2005-220600 filed on Jul. 29, 2005 is incorporated by reference in its entirety.

What is claimed is:

1. A micro-manipulator comprising:
    gripping means for gripping micro-material, said gripping means having gripping fingers so that the micro-material is gripped by bringing leading ends of the gripping fingers into close proximity;
    first moving means for moving the gripping means in an X direction and in a Y direction perpendicularly to the X direction, said first moving means changing a position of the gripping means to rotate the gripping fingers around leading ends of the gripping fingers; and
    second moving means supported by the first moving means and supporting the gripping means, said second moving means moving the gripping means in a Z direction perpendicularly to the X and Y directions.

2. The micro-manipulator according to claim 1, wherein the first moving means comprises a pantograph mechanism to synthesize and enlarge a displacement of an input in the X and Y directions, the pantograph mechanism supporting the second moving means at an output side of the pantograph mechanism.

3. The micro-manipulator according to claim 2, wherein the pantograph mechanism includes an X direction input link to receive a driving force from an X direction actuator that supplies a driving force in the X direction; a Y direction input link including a Y direction actuator to supply a driving force in the Y direction; and an output link to synthesize displacements in the X and Y directions based upon the X direction driving force and the Y direction driving force generated by the X and Y direction actuators, and output the displacements thereof.

4. The micro-manipulator according to claim 3, wherein said first moving means includes a position changing actuator for changing a position of the gripping fingers, a driving force from the position changing actuator being input to one of the X direction input link and the Y direction input link.

5. A micro-manipulator comprising:
gripping means for gripping micro-material, said gripping means having gripping fingers so that the micro-material is gripped by bringing leading ends of the gripping fingers into close proximity;
first moving means for moving the gripping means in an X direction and in a Y direction perpendicularly to the X direction, and for changing a position of the gripping means in order to swing the gripping fingers around leading ends of the gripping fingers; and
second moving means supported by the first moving means and supporting the gripping means, said second moving means moving the gripping means in a Z direction perpendicularly to the X and Y directions,
wherein the first moving means comprises a pantograph mechanism to synthesize and enlarge a displacement of the gripping means in the X and Y directions, the pantograph mechanism supporting the second moving means at an output side of the pantograph mechanism,
the pantograph mechanism includes an X direction input link to receive a driving force from an X direction actuator that supplies a driving force in the X direction; a Y direction input link including a Y direction actuator to supply a driving force in the Y direction; and an output link to synthesize displacements in the X and Y directions based upon the X direction driving force and the Y direction driving force generated by the X and Y direction actuators, and output the displacements thereof, and
one of the X direction input link and the Y direction input link maintains a state parallel with the output link.

6. A micro-manipulator comprising:
gripping means for gripping micro-material, said gripping means having gripping fingers so that the micro-material is gripped by bringing leading ends of the gripping fingers into close proximity;
first moving means for moving the gripping means in an X direction and in a Y direction perpendicularly to the X direction, and for changing a position of the gripping means in order to swing the gripping fingers around leading ends of the gripping fingers; and
second moving means supported by the first moving means and supporting the gripping means, said second moving means moving the gripping means in a Z direction perpendicularly to the X and Y directions,
wherein the first moving means comprises a pantograph mechanism to synthesize and enlarge a displacement of the gripping means in the X and Y directions, the pantograph mechanism supporting the second moving means at an output side of the pantograph mechanism,
the pantograph mechanism includes an X direction input link to receive a driving force from an X direction actuator that supplies a driving force in the X direction; a Y direction input link including a Y direction actuator to supply a driving force in the Y direction; and an output link to synthesize displacements in the X and Y directions based upon the X direction driving force and the Y direction driving force generated by the X and Y direction actuators, and output the displacements thereof, and
an output unit of one of the X direction actuator and the Y direction actuator movably supports the position changing actuator in one of the X and Y directions, and the driving force from the position changing actuator displaces a position of the X direction input link or the Y direction input link via a lever member.

7. The micro-manipulator according to claim 5, wherein an output unit of one of the X direction actuator and the Y direction actuator movably supports the position changing actuator in one of the X and Y directions, and the driving force from the position changing actuator displaces a position of the X direction input link or the Y direction input link via a lever member.

8. The micro-manipulator according to claim 5, wherein the pantograph mechanism further comprises first to seventh links in substantially straight lines; one end of the first link being connected to the Y direction input link; one end of the second link being connected to an end of the X direction input link; one end of the third link being connected to another end of the X direction input link; one end of the fourth link being connected to an end of the output link; one end of the fifth link being connected to another end of the output link; the other end of the first link being connected to the other end of the fourth link; the other end of the third link being connected to the other end of the fifth link; one end of the sixth link being connected to the other ends of the third and fifth links; one end of the seventh link being connected to an end of the second link and an end of the X direction input link; and the other ends of the second link and the sixth link being connected to a same position with the fourth link so that the sixth link can maintain a parallel state with the X direction input link and the output link; and the other end of the seventh link being connected to the first link to maintain a state parallel with the fourth link.

9. The micro-manipulator according to claim 8, wherein the pantograph mechanism includes a first triangle defined by a first point where the end of the first link is connected to the Y direction input link, a second point where the ends of the second and seventh links are connected to the X direction input link, and a third point where the other end of the seventh link is connected to the first link, and
a second triangle defined by a fourth point where the one end of the first link is connected to the Y direction input link, a fifth point where the one end of the fourth link is connected to the one end of the output link, and a sixth point where the other end of the first link is connected to the other end of the fourth link, said first triangle maintaining a similar state to the second triangle.

10. The micro-manipulator according to claim 9, wherein the driving force is input from the position change actuator to one end of a lever member and another end of the lever member is fastened to the X direction input link, and
a distance between the one end and the other end of the lever member, and a point where the one end of the link is connected to the output link, and a distance between the leading ends of the gripping finger have a same homothetic ratio as between the first triangle and the second triangle.

11. The micromanipulator according to claim 1, wherein said second moving means moves the gripping fingers in the Z direction without moving the first moving means.

12. The micro-manipulator according to claim 2, wherein the first moving means further comprises an X-direction actuator, a Y-direction actuator, and a position changing actuator for turning the gripping means horizontally around the leading ends of the gripping fingers, said X-direction, Y-direction and position changing actuators being attached to the pantograph mechanism.

* * * * *